(12) United States Patent
Pankratov

(10) Patent No.: US 10,865,657 B2
(45) Date of Patent: Dec. 15, 2020

(54) SEALING ASSEMBLY FOR A GAS TURBINE ENGINE

(71) Applicant: PRATT & WHITNEY CANADA CORP., Longueuil (CA)

(72) Inventor: Maksim Pankratov, Mississauga (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 159 days.

(21) Appl. No.: 15/960,094

(22) Filed: Apr. 23, 2018

(65) Prior Publication Data
US 2019/0323382 A1 Oct. 24, 2019

(51) Int. Cl.
*F01D 25/18* (2006.01)
*F16J 15/40* (2006.01)

(52) U.S. Cl.
CPC ............ *F01D 25/183* (2013.01); *F16J 15/40* (2013.01); *F05D 2220/32* (2013.01); *F05D 2240/55* (2013.01); *F05D 2260/98* (2013.01)

(58) Field of Classification Search
CPC ..... F01D 25/183; F16J 15/40; F05D 2240/55; F05D 2260/98
See application file for complete search history.

(56) References Cited

U.S. PATENT DOCUMENTS

| | | | | |
|---|---|---|---|---|
| 2,554,234 A | * | 5/1951 | Baudry | F16J 15/40 277/432 |
| 2,917,329 A | * | 12/1959 | Laser | F16C 33/78 277/422 |
| 3,190,661 A | * | 6/1965 | Wahl | F16J 15/30 277/409 |
| 3,743,304 A | * | 7/1973 | Lindeboom | F16J 15/441 277/422 |
| 3,915,459 A | * | 10/1975 | Kunderman | F01D 11/00 277/411 |
| 4,128,248 A | * | 12/1978 | Kabelitz | F16J 15/40 277/558 |
| 4,229,011 A | * | 10/1980 | Wikelski | F04B 39/041 277/432 |
| 4,406,463 A | * | 9/1983 | Fabrowsky | F16J 15/56 277/422 |

(Continued)

FOREIGN PATENT DOCUMENTS

FR 2997470 B1 * 9/2016 ............ F01D 11/001

*Primary Examiner* — Eugene G Byrd
(74) *Attorney, Agent, or Firm* — Norton Rose Fulbright Canada LLP

(57) ABSTRACT

A sealing assembly for sealing between an oil cavity and an air cavity of a gas turbine is provided. The sealing assembly comprising a seal having a seal element and a circumferential seal housing receiving the seal element. The seal housing has an annulus extending circumferentially around a center axis, radially between an outer periphery and an inner periphery, and axially along the center axis between a first surface and a second surface. The seal housing has a collecting channel defined circumferentially in the inner periphery about the center axis and a draining pocket defined in a portion of the seal housing configured and disposed to in use collect liquid oil during engine operation. The draining pocket extends from the collecting channel to the first surface and configured to communicate collected liquid oil from the collecting channel to the oil cavity.

19 Claims, 8 Drawing Sheets

(56) References Cited

U.S. PATENT DOCUMENTS

| | | | | |
|---|---|---|---|---|
| 4,486,024 A | * | 12/1984 | Cooper | F16J 15/40 |
| | | | | 277/422 |
| 4,815,748 A | * | 3/1989 | Schubert | F16J 15/441 |
| | | | | 277/422 |
| 5,014,999 A | * | 5/1991 | Makhobey | F01D 11/003 |
| | | | | 277/422 |
| 5,106,208 A | * | 4/1992 | Bobo | F01D 25/164 |
| | | | | 29/898.1 |
| 5,147,015 A | * | 9/1992 | Snuttjer | F16J 15/406 |
| | | | | 184/104.1 |
| 5,178,400 A | * | 1/1993 | Singh | F01D 25/164 |
| | | | | 277/644 |
| 6,070,881 A | * | 6/2000 | Longree | F16J 15/40 |
| | | | | 277/409 |
| 7,125,018 B2 | | 10/2006 | Busse et al. | |
| 8,167,494 B2 | | 5/2012 | Gibbons | |
| 9,309,975 B2 | * | 4/2016 | Kostka | F01D 11/003 |
| 2015/0086388 A1 | * | 3/2015 | Hold | F04B 39/0207 |
| | | | | 417/53 |
| 2016/0305283 A1 | * | 10/2016 | Morreale | F01D 25/16 |
| 2019/0017605 A1 | * | 1/2019 | Miller | F01D 11/003 |

\* cited by examiner

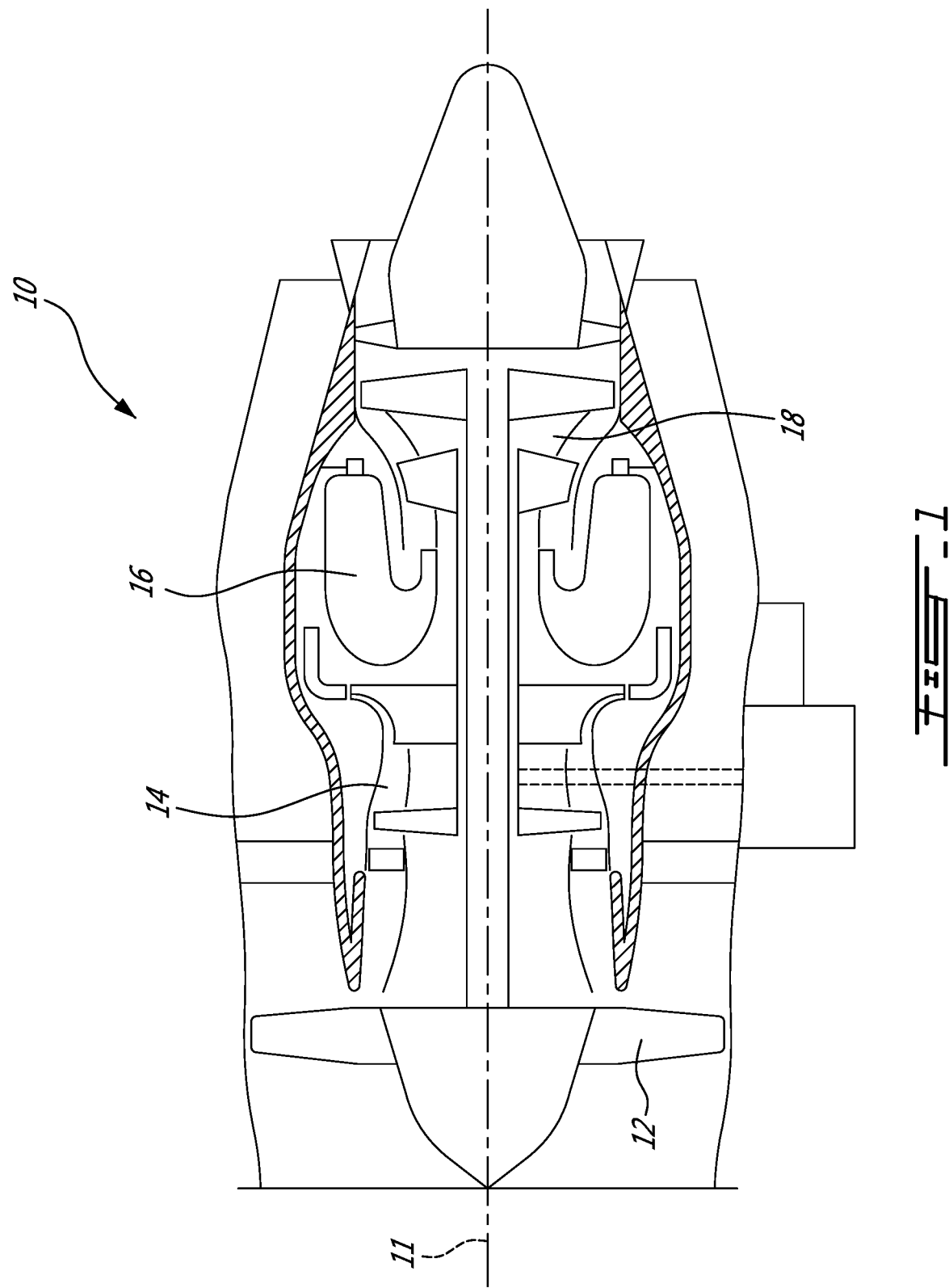

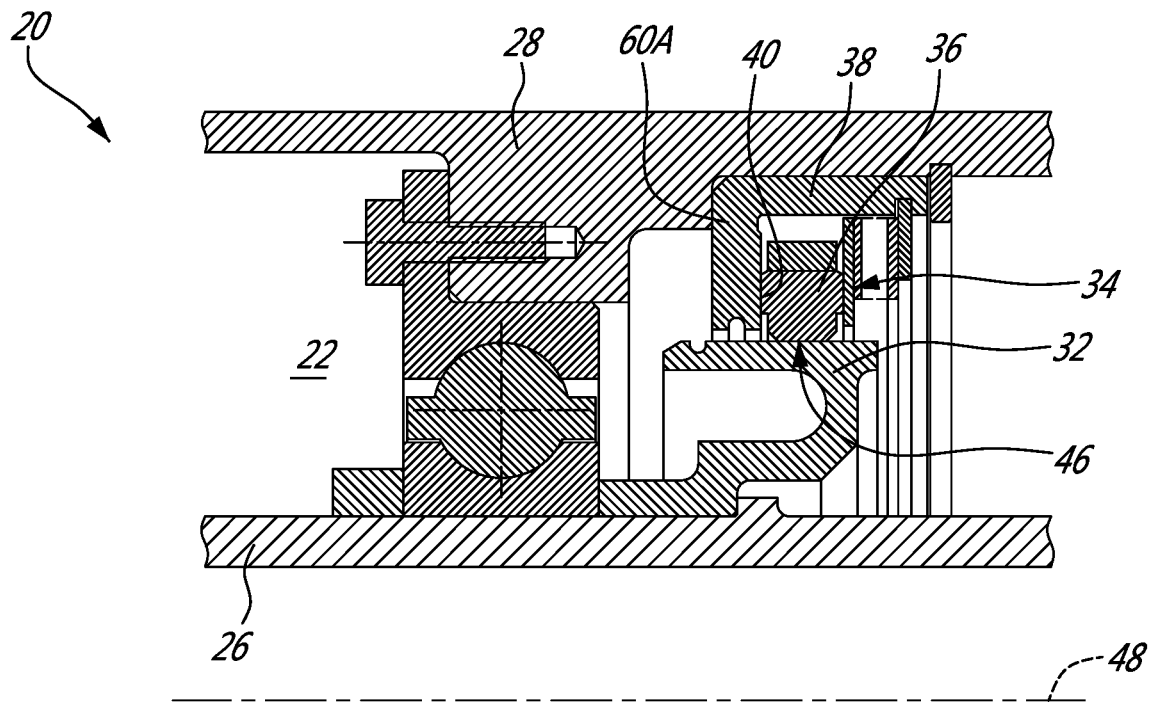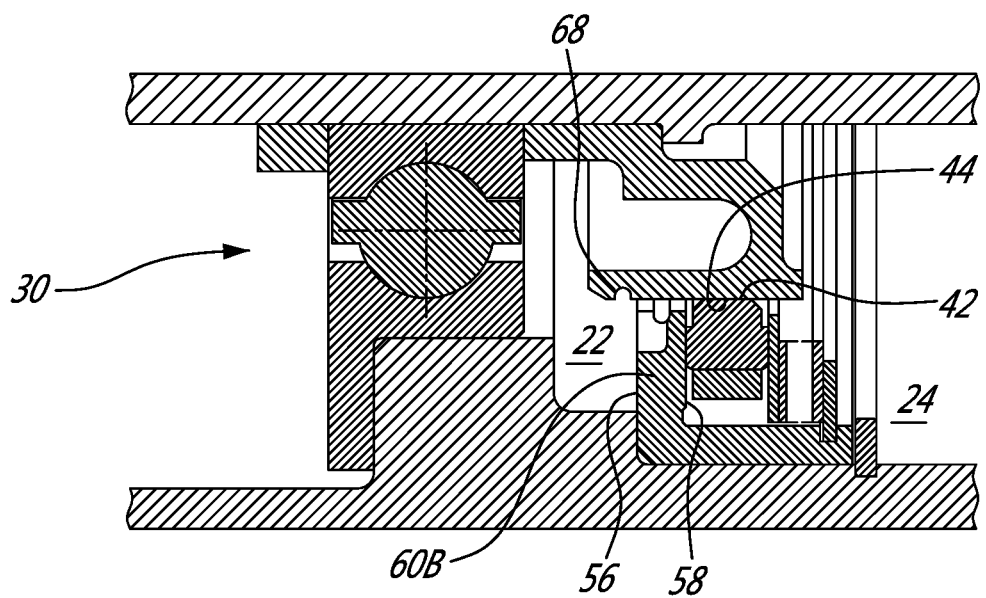
FIG. 2A

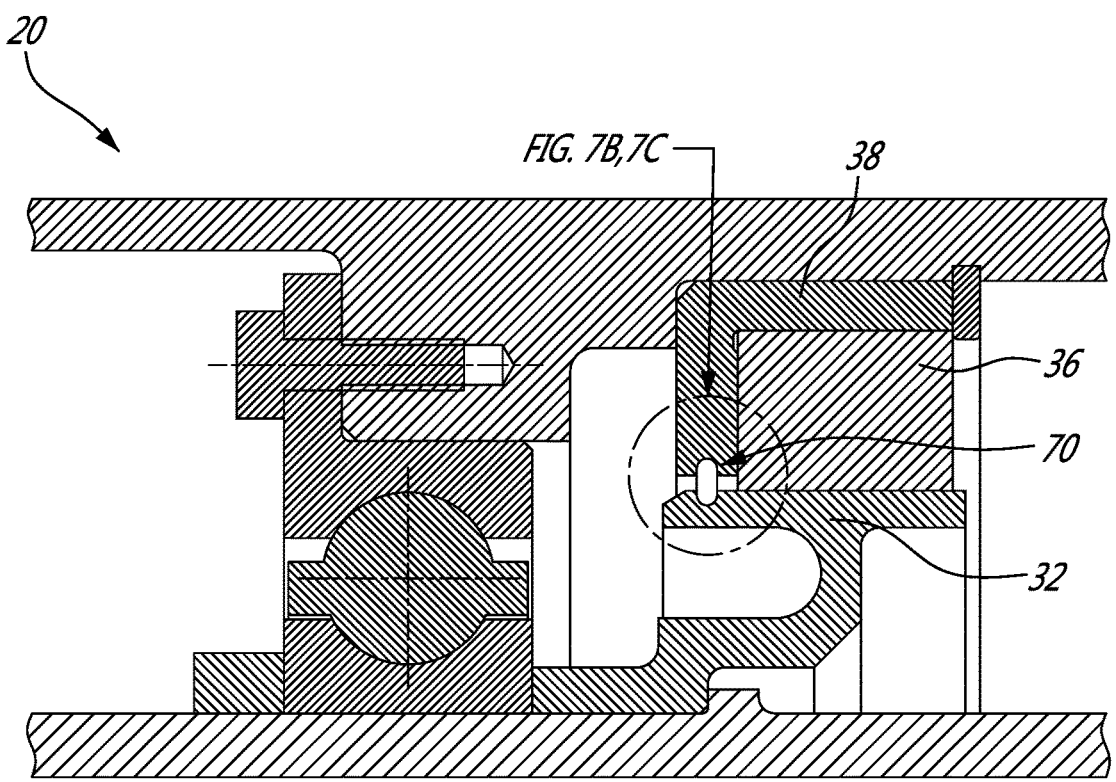
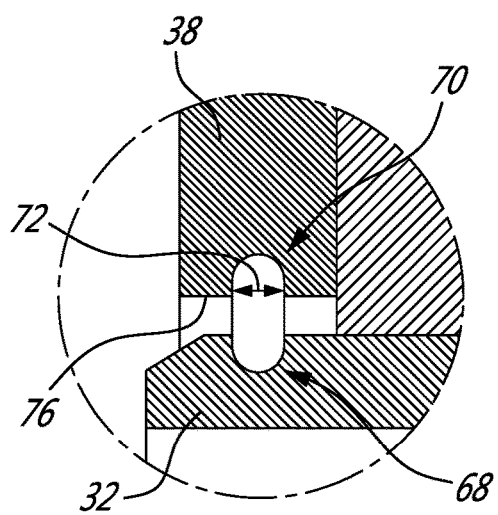 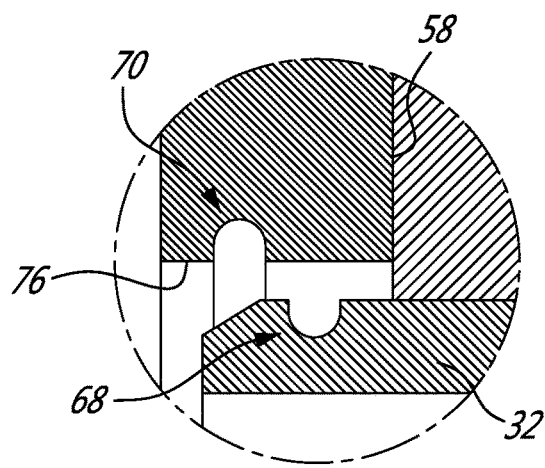

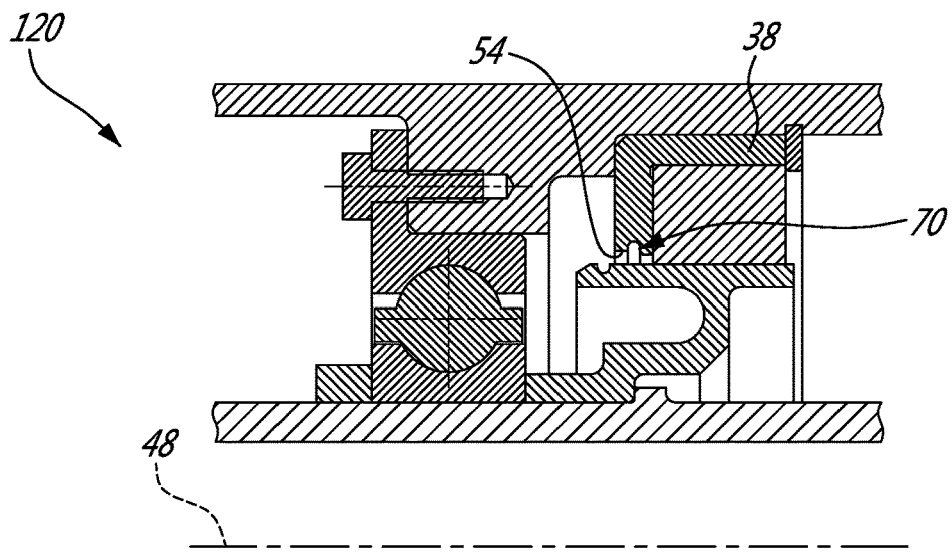
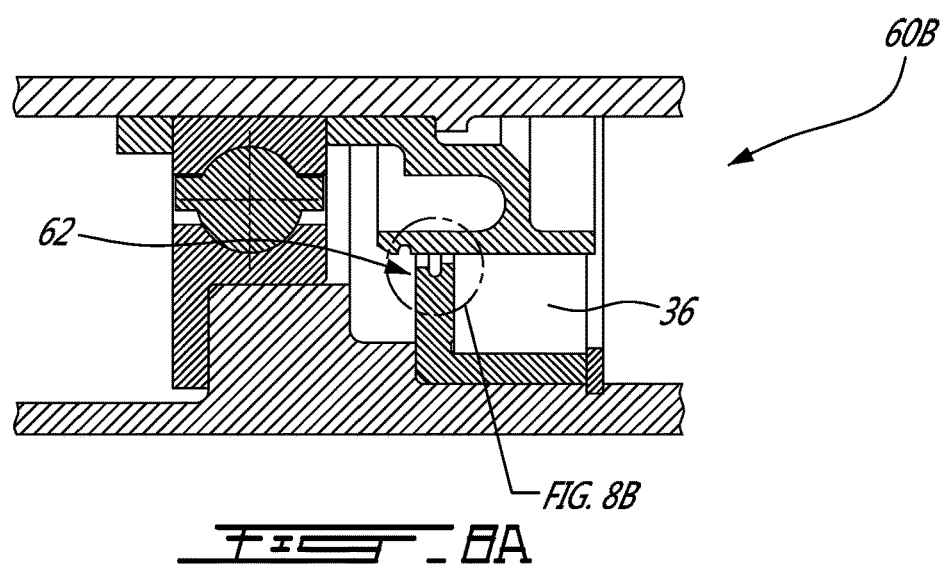
FIG. 8A
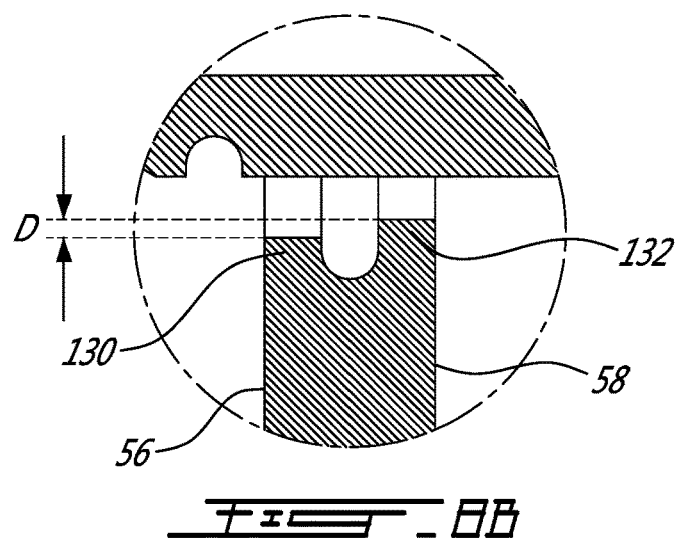
FIG. 8B

SEALING ASSEMBLY FOR A GAS TURBINE ENGINE

TECHNICAL FIELD

The application relates generally to sealing assemblies of gas turbine engines and, more particularly, to oil drainage of the sealing assemblies.

BACKGROUND OF THE ART

Sealing assemblies, such as controlled-gap radial seals, may be used in gas turbine engines for sealing between an oil cavity and an air cavity. A sealing assembly generally includes a seal element, a seal housing and a seal runner. In operation when air pressure is low, for example after engine shut down and/or at low power conditions, oil from the oil cavity may leak along the seal runner or along the seal housing toward the seal element. This may happen when oil splashed on the seal housing sticks to the seal housing and forms an oil film that can leak toward an inner diameter of the seal housing. A portion of the leaking oil may reach the seal element and form oil deposits on a sealing face of the seal housing located between the seal housing and the seal element. Consequently, these oil deposits may compromise sealing performance of the sealing assemblies.

SUMMARY

In one aspect, there is provided a sealing assembly for sealing between an oil cavity and an air cavity of a gas turbine engine, the sealing assembly comprising a seal having a seal element and a circumferential seal housing receiving the seal element, the seal housing having an annulus extending circumferentially around a center axis, radially between an outer periphery and an inner periphery, and axially along the center axis between a first surface and a second surface, the seal housing having a collecting channel defined circumferentially in the inner periphery about the center axis and a draining pocket defined in a portion of the seal housing configured and disposed to in use collect liquid oil during engine operation, the draining pocket extending from the collecting channel to the first surface and configured to communicate collected liquid oil from the collecting channel to the oil cavity.

In another aspect, there is provided a seal housing for a gas turbine engine, the seal housing comprising a circumferential body defined as an annulus extending radially around a center axis between an outer periphery and an inner periphery and extending axially along the center axis between a first surface and a second surface, the seal housing having a bottom portion configured to be positioned below the center axis when the seal is mounted to the gas turbine engine, a collecting channel defined circumferentially in the inner periphery about the center axis, and a draining pocket defined in the bottom portion of the seal housing and extending from the collecting channel to the first surface to communicate the collecting channel with an exterior of the seal housing.

In another aspect, there is provided a seal housing for a gas turbine engine, the seal housing comprising a circumferential body defined as an annulus extending radially around a center axis between an outer periphery and an inner periphery and extending axially along the center axis between a first surface and a second surface, the seal housing having a bottom portion configured to be positioned below the center axis when the seal is mounted to the gas turbine engine, a collecting channel defined circumferentially in the inner periphery about the center axis between a first lip and a second lip, the first and second lips projecting radially inward relative to, and toward, the center axis, at least a tip of the second lip in the bottom portion of seal housing is radially closer to the center axis than a tip of the first lip.

In a further aspect, there is provided a method for sealing an oil cavity of a gas turbine engine, the method comprising directing air toward the oil cavity through a gap between a seal housing and a seal runner; collecting oil in a collecting channel defined circumferentially in an inner periphery of the seal housing around a center axis; flowing the oil from the collecting channel toward a draining pocket, the draining pocket defined at a lowest circumferential position of the inner periphery relative to the center axis when the seal housing is mounted to the gas turbine engine; and draining the oil from the draining pocket away from the inner periphery.

DESCRIPTION OF THE DRAWINGS

Reference is now made to the accompanying figures in which:

FIG. 1 is a schematic cross-sectional view of a gas turbine engine;

FIG. 2A is a schematic cross-sectional view of a sealing assembly in accordance with an embodiment of the present disclosure;

FIG. 7A is a schematic cross-sectional view of a top portion of the sealing assembly of FIG. 2B, with the seal housing positioned relative to a seal runner;

FIG. 7B is an enlarged view of a portion of the sealing assembly of FIG. 7A, illustrating a first position of the seal housing;

FIG. 7C is an enlarged view of a portion of the sealing assembly of FIG. 7A, illustrating a second position of the seal housing;

FIG. 8A is a schematic cross-sectional view of a sealing assembly in accordance with an alternate embodiment of the present disclosure; and FIG. 8B is an enlarged view of a portion of the bottom portion of sealing assembly of FIG. 8A.

DETAILED DESCRIPTION

Figure 2B:
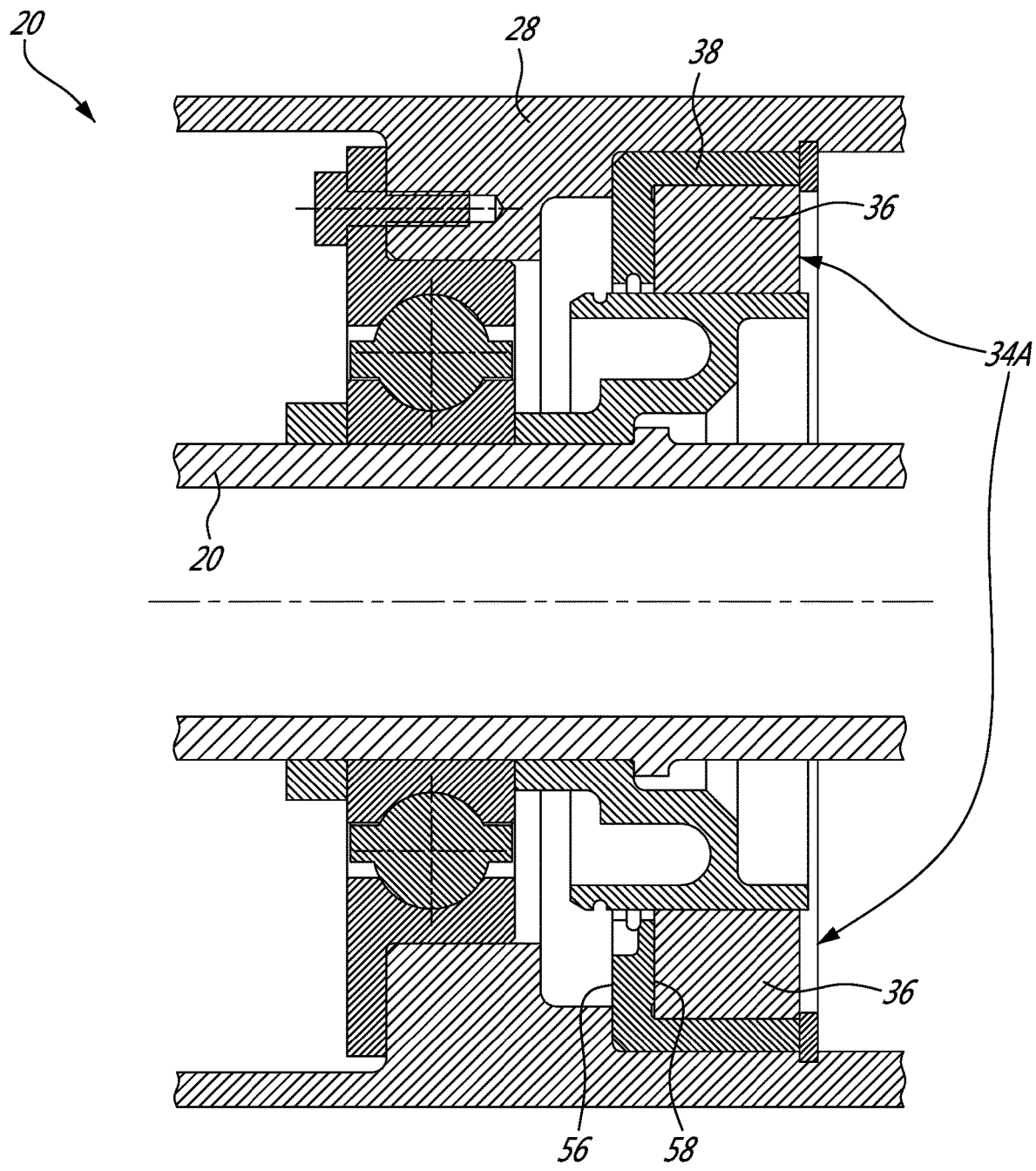
FIG. 2B is a schematic cross-sectional view of the sealing assembly of FIG. 2A having a seal type different from a seal type shown in FIG. 2A.

FIG. 1 illustrates a gas turbine engine 10 of a type preferably provided for use in subsonic flight, generally comprising in serial flow communication along an engine axis 11 a fan 12 through which ambient air is propelled, a compressor section 14 for pressurizing the air, a combustor 16 in which the compressed air is mixed with fuel and ignited for generating an annular stream of hot combustion gases, and a turbine section 18 for extracting energy from the combustion gases.

FIG. 2A illustrates a sealing assembly 20 mounted in the gas turbine engine 10. The sealing assembly 20 can be used to seal a cavity, compartment, housing, or the like. For example, the sealing assembly 20 may be used to seal bearing cavities 22 containing oil. That is, the sealing assembly 20 is provided to seal the oil within the bearing cavity 22 and/or to avoid a flow of oil from the bearing cavity 22 toward adjacent air or seal cavities 24. It is understood that the sealing assembly 20 is not limited to sealing bearing cavities 22 and may be used to seal other cavities of the gas turbine engine 10. In the embodiment shown in FIG. 2A, the sealing assembly 20 is sometimes referred to as a "controlled gap radial seal", as explained hereinafter.

In the embodiment shown in FIG. 2A, the sealing assembly 20 is mounted between the bearing cavity 22 and the adjacent air cavity 24. The bearing cavity 22 is intended to refer to any suitable cavity in which oil circulates due to the lubrication of components in the cavity. The air cavity 24 is intended to refer to any cavity of the gas turbine engine 10 that aims to limit the presence of oil therein. The sealing assembly 20 is mounted around a shaft 26 of the gas turbine engine 10 and is surrounded by a casing 28, or like structure of the gas turbine engine 10. A bearing 30 that supports the shaft 26 is mounted in the bearing cavity 22 and oil is provided to the bearing cavity 22 to lubricate the bearing 30.

In operation, the sealing assembly 20 is adapted to collect oil flowing from the bearing cavity 22 toward the air cavity 24, if any, in a collecting channel 70 and to drain the oil back to the bearing cavity 22 via a draining pocket 78.

The sealing assembly 20 may include a seal runner 32 rotatable with the shaft 26 and a seal 34 at least partially surrounding the seal runner 32. The seal 34 is non-rotatably mounted to the casing 28. That is, the seal 34 does not usually rotate during the operation of the engine 10. The seal runner 32 and the corresponding seal 34 are mounted between the bearing cavity 22 and the air cavity 24 to seal therebetween.

The seal 34 may include a seal element 36 and a seal housing 38 that receives the seal element 36. In operation, the seal element 36 is mounted in the seal housing 38 such that the seal housing 38 circumferentially surrounds the seal element 36 and forms a sealing face 40 that may be a sealing plane 40 where the seal element 36 contacts the seal housing 38. In the embodiment shown in FIG. 2A, a controlled gap seal is shown. In alternate embodiments, any type of seal may be used including, but not limited to, radial controlled gap carbon seal, face contact seal, radial contact seal, labyrinth seal, lip seal, and the like. Regardless of the type of seal that may be used, the sealing assembly 20 is adapted to collect and/or redirect the oil, that may flow from the bearing cavity 22 toward the seal element 36, if any, through the collecting channel 70 and the draining pocket 78.

In the example of the controlled gap seal, the seal element 36 surrounds the seal runner 32 and has an inside diameter 42 or bore which is slightly greater than an outside diameter 44 of the seal runner 32. As a result of this difference in dimensions, a clearance is provided in the form of a gap 46 between an outer surface or the outside diameter 44 of the seal runner 32 and an inner annular surface or the inside diameter 42 of the seal element 36. The gap 46 can be "controlled" by a shrink band as described below, or by any other suitable methods.

The seal element 36 is intended to refer to any suitable element that can cooperate with the seal runner 32 to provide the controlled gap 46 with the seal runner 32, or even rub against the seal runner 32 in some configurations so as to seal any clearance path. For example, the seal element 36 can be any suitable component such as a carbon ring. In operation, in the controlled gap embodiment, pressurized air in the air cavity 24 may flow toward the bearing cavity 22 through the controlled gap 46. The seal housing 38 is mounted to the casing 28 and circumferentially surrounds the seal runner 32. The seal housing 38 may have a center axis 48 concentric with an axis of the seal runner 32 (i.e. the shaft 26) when the seal housing 38 is mounted to the gas turbine engine 10. As mentioned, while a controlled gap seal is described above, the sealing assembly 20 may have other configurations as well. For example, the sealing assembly 20 may include a seal element 36A pressed against the seal housing 38, or against the seal runner 32, as shown in FIG. 2B. This is an example among others of the different seal assemblies that may be used in accordance with the present disclosure.

Figure 3:
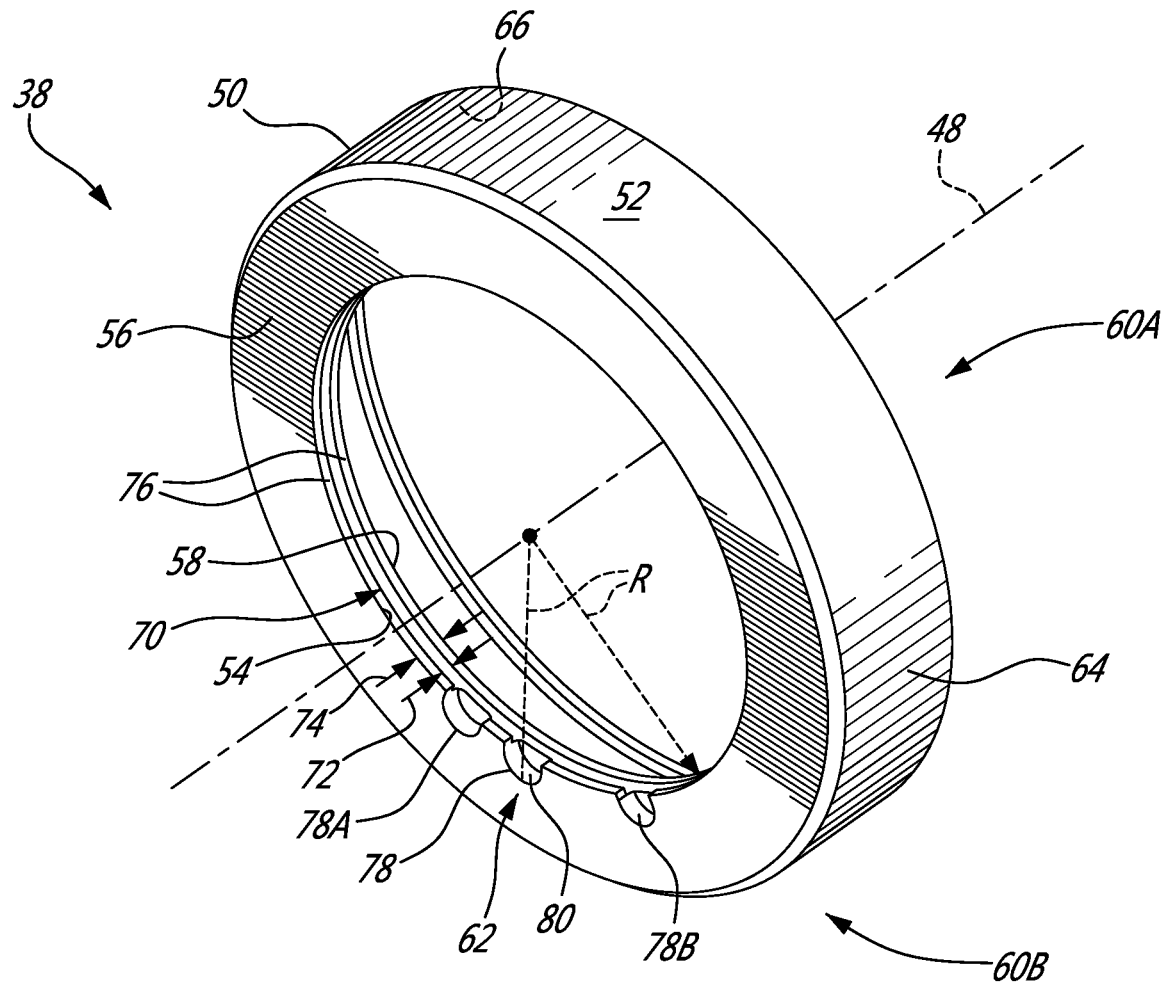
FIG. 3 is a schematic perspective view of a seal housing that can be used with any one of the seal types of FIGS. 2A and 2B.

Referring to FIG. 3, the seal housing 38 defines an annulus body or annulus 50 that extends radially around the center axis 48 between an outer periphery 52 and an inner periphery 54 and that extends axially along the center axis 48 between an exterior surface 56 and a contact surface 58 (also shown in FIG. 2A) against which the seal element 36 is applied. The contact surface 58 is configured to abut the seal element 36 to form the sealing plane 40 between the seal housing 38 and the seal element 36. In an alternate embodiment, the contact surface 54 may define a surface that does not contact the seal element 36. The exterior surface 56 at least partially delimits the bearing cavity 22. In the embodiment shown in FIGS. 2A-3, the exterior surface 56 of the annulus body 50 extends in a plane to which the center axis 48 is normal, although other geometrical relations are contemplated as well.

The seal housing 38 may also define a tubular body or a circumferential leg that extends along the outer periphery 52 from the contact surface 58 in a direction away from the exterior surface 56 to form a sleeve 64. As such, the sleeve 64 can receive the seal element 36 therein. In the embodiment shown in FIG. 3, the seal housing 38 includes the annulus 50 and the circumferential leg or sleeve 64. An inner diameter 66 of the sleeve 64 is larger than the inner periphery 54 of the annulus 50. For example, the contact surface 58 may be defined between the inner periphery 54 and the inner diameter 66 of the sleeve 64. The seal housing 38 may have a circular shape as shown in FIG. 3. In an alternate embodiment, the seal housing 38 may have any other suitable shape.

Referring to FIGS. 2A-3, the seal housing 38 is defined as having a top portion 60A and a bottom portion 60B. Although the terms "top portion" and "bottom portion" are used, it is understood that these relative terms are used to describe one element's relationship to another element as illustrated in the figures relative to a direction of gravity when the seal housing 38 is mounted to the gas turbine engine 10. The top portion 60A is intended to refer to a portion that possesses a greater gravitational potential energy relative to the bottom portion 60B. That is, the two portions 60A, 60B are not necessarily two distinct, or physically separate, portions. The seal housing 38 can be formed from an integral body. The top portion 60A is the upper half of the seal housing 38, i.e., the portion positioned above a horizontal plane in which lies the center axis 48. Likewise, the bottom portion 60B is the lower half of the seal housing 38, i.e., the portion positioned below the horizontal plane in which lies the center axis 48 when the seal housing 38 is mounted to the gas turbine engine 10. In FIGS. 2A-2B, such horizontal plane is perpendicular to the sheet of FIGS. 2A-2B. In the embodiment shown in FIG. 2A, the top portion 60A is the upper half of the seal housing 38 and the bottom portion 60B is the lower half of the seal housing 38. The bottom portion 60B may alternately be defined as any part of the lower half of the seal housing 38 and may exclude the complete lower half. For example, the bottom portion 60B may be defined as a segment smaller than the lower half. The bottom portion 60B may include a lowest circumferential position 62 of the seal housing 38 relative to the direction of gravity when the seal 34 is mounted to the gas turbine engine 10. The lowest circumferential position 62 can be referred to as including a "bottom-dead-center" of the seal housing 38. For greater clarity, the circumferential position 62 is relative to an angular position around the center axis 48. The circumferential position 62 is not limited to a radial length.

In operation, the oil within the bearing cavity 22 may be splashed on the seal runner 32 and may leak toward the seal 34, the seal element 38, and/or the sealing face 40. A dripping groove 68 may be defined circumferentially in the seal runner 32 (shown for example in FIGS. 2A and 5) to reduce the amount of oil that may leak along the seal runner 32 toward the seal 34, the seal element 38, and/or the sealing face 40. The oil may also be splashed on the exterior surface 56 and/or on the inner periphery 54 of the seal housing 38. The oil may stick on the seal housing 38 and consequently may leak on the inner periphery 54 toward the seal 34, the seal element 38, and/or the sealing face 40. This could happen when the pressure inside the air cavity 24 is relatively low relative to a pressure inside the bearing cavity 22. For example, the relatively low pressure inside the air cavity 24 may be reached at low power conditions of the engine 10 and/or after engine shut down.

The seal housing 38 includes a collecting channel 70 defined circumferentially in the inner periphery 54 of the annulus 50 about the center axis 48. The collecting channel 70 may catch, or collect, the oil leaking along the inner periphery 54. As such, the collecting channel 70 may prevent, or reduce, the oil flowing toward the seal element 36. The collecting channel 70 is shown as a depression defined in the inner periphery 54 in a radial direction R, for instance in the shape of an annular channel. However, other shapes are contemplated as well, such a stepped groove open to the exterior surface 56. The radial direction R is intended to refer to directions perpendicular to the center axis 48.

The collecting channel 70 has an axial width 72 at the inner periphery 54 that is smaller than an axial width 74 of the inner periphery 54 between the exterior and contact surfaces 56, 58 such that the inner periphery 54 may define a lip 76 on each side of the collecting channel 70. The collecting channel 70 may be sized and/or shaped such that only a surface tension of the oil is sufficient to maintain an adherence between the oil and the collecting channel 70 and yet allow the oil to flow through the collecting channel 70 by the effect of gravity. For example, the size of the axial width 72 and/or the shape of the internal surface of the collecting channel 70 may be configured to increase the resultant effect of the adherence of the oil. The collecting channel 70 is shown in FIGS. 2A-6 as having a U-shaped cross-section, or a semi-circular cross-section. It is understood that other suitable cross-sectional shapes are possible.

The seal housing 38 may be formed from any suitable material such that only the surface tension of the oil is sufficient to maintain an adherence between the oil and the collecting channel 70 and yet allow the oil to flow through the collecting channel 70. That is, forces attributable to the surface tension of the oil allow the oil to adhere to the collecting channel 70. The ability of the oil to adhere to a surface is sometimes referred to as an "oil wetting ability". For example, the seal housing 38 may be formed from metallic materials which have suitable oil wetting ability.

The seal housing 38 includes a draining pocket 78 defined in the inner periphery 54 and in the exterior surface 56 of the annulus 50. The draining pocket 78 extends from the collecting channel 70 to the exterior surface 56 to communicate the collecting channel 70 to an exterior of the seal housing 38. In the embodiment shown in FIG. 2A, the exterior of the seal housing 38 is the bearing cavity 22. Thus the oil within the collecting channel 70 may flow toward the bearing cavity 22 through the draining pocket 78, by the effect of gravity. In the embodiment shown in FIG. 3, the draining pocket 78 is defined by a depression defined in the exterior surface 56 and a contiguous depression defined in the inner periphery 54. A portion of the draining pocket 78 is defined in the internal surface of the collecting channel 70 such that oil in the collecting channel 70 would flow toward the draining pocket 78 under gravity. Stated differently, the groove 78 disrupts the surface of the collecting channel 70 for oil to naturally flow into the draining pocket 78. The draining pocket 78 may disrupt the surface of the collecting channel 70 toward the outer periphery 52. For example, the draining pocket 78 may form a waterfall surface relative to the surface of the collecting channel 70.

A bottom of the draining pocket 80 along the radial direction R relative to the inner periphery 54 is disposed in a same circumferential position as the lowest circumferential position 62. In use, when the sealing assembly 20 is mounted in the gas turbine engine 10, the oil within the collecting channel 70 flows toward the draining pocket 78 under gravity. In other words, since the draining pocket 78 is located in the bottom portion 60B, and optionally when located at the lowest circumferential position 62, the gravitational forces may cause the oil to flow toward the lowest circumferential position 62. Although a channel 78 is shown and described, other configurations are contemplated or included in the expression channel 78, such as passage, tube, groove, and the like.

Figure 4:
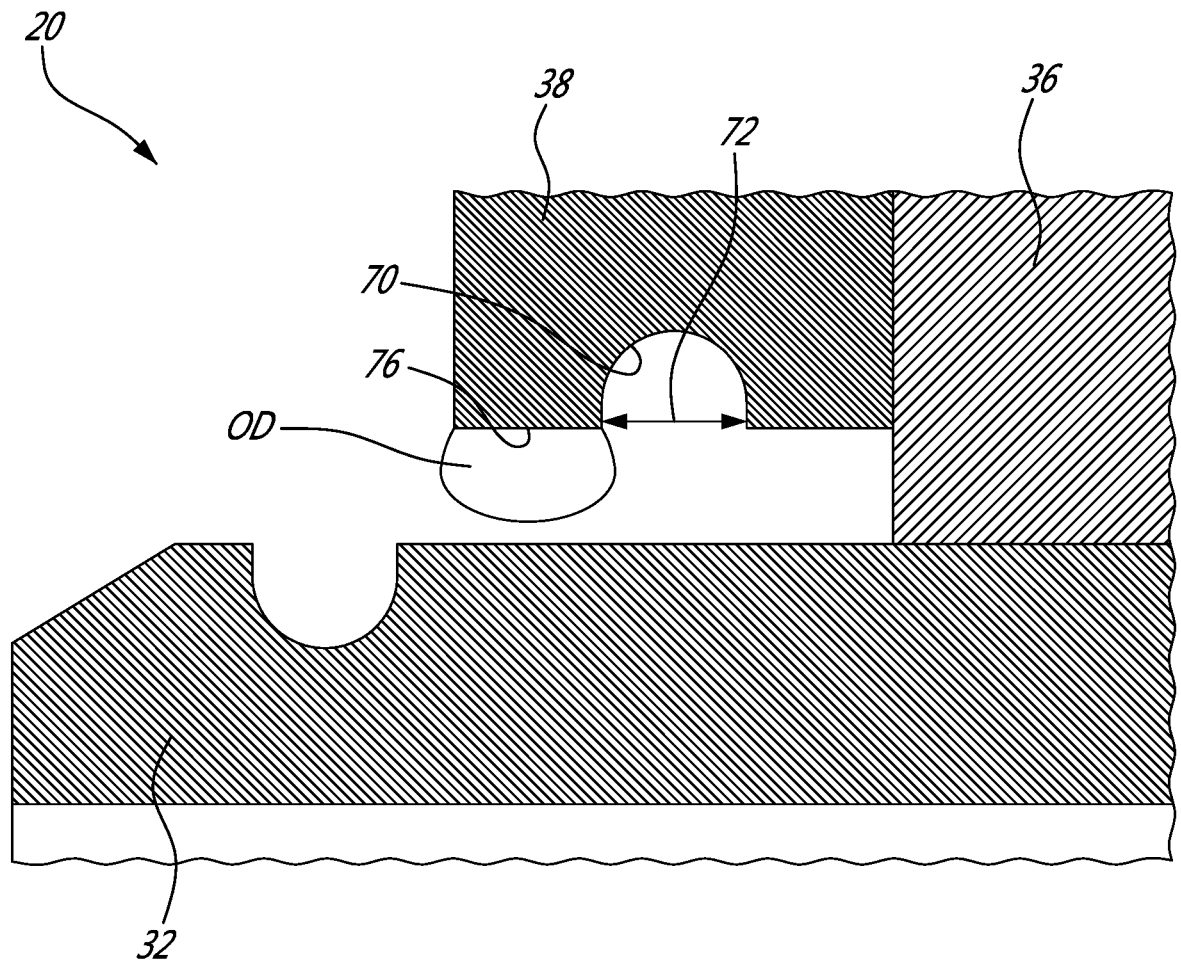
FIG. 4 is an enlarged view of a section of the sealing assembly of FIG. 2B, illustrating an oil droplet.

Referring to FIG. 4, an enlarged section of the sealing assembly 20 is shown. In operation, the oil may not attach directly to the collecting channel 70. Rather, the oil may stick on the surface of the inner periphery 54. Consequently, the collecting channel 70 can serve as a barrier to halt the flow of the oil. For example, a minimum value of the axial width 72 may be sufficient to halt the flow of the oil on the lip 76. In this case, the collecting channel 70 will act as a barrier or stopper not allowing the oil to flow further along the inner periphery 54 toward the seal element 36. Oil droplets OD may stick to the seal housing 38 on the lip 76 and eventually drain under gravity toward the bearing cavity 22 through the draining pocket 78.

The seal housing 38 may include more than one draining pocket at different circumferential positions of the seal housing 38. For example, the seal housing may include three draining pockets 78, 78A, 78B in the bottom portion 60B.

Figure 6:
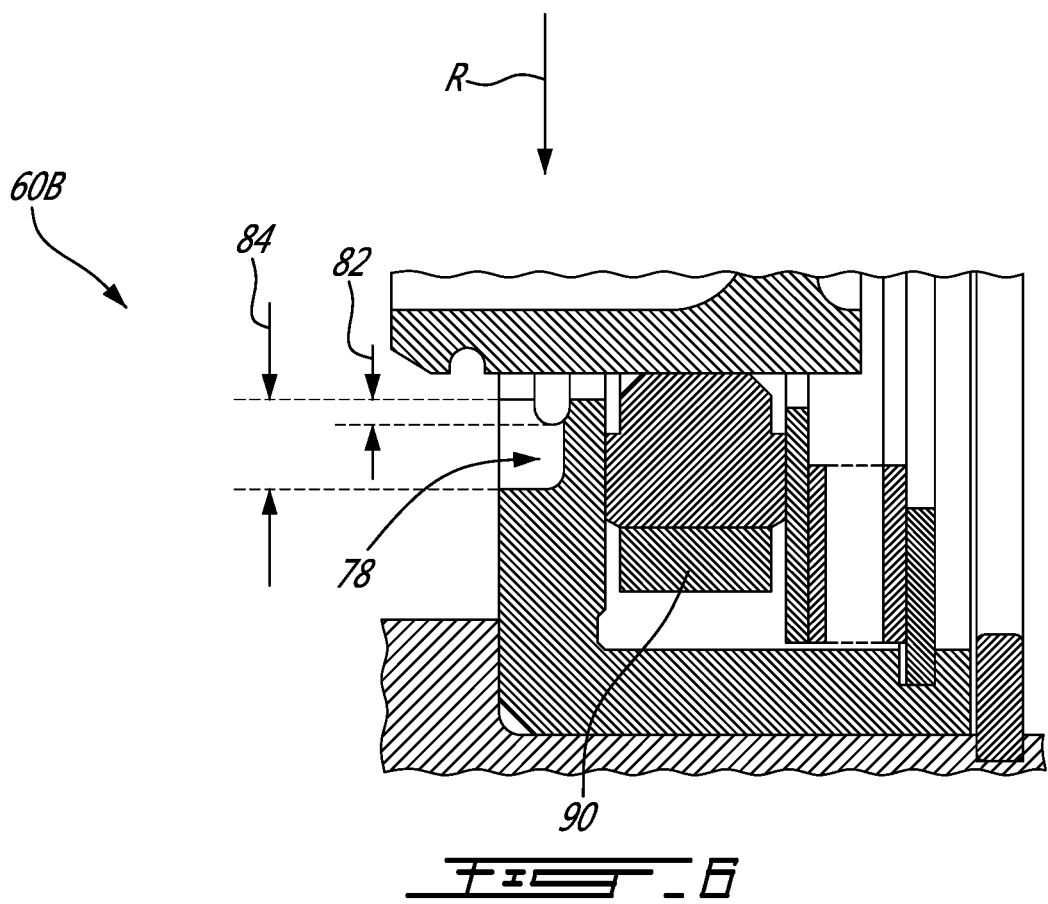
FIG. 6 is an enlarged view of a bottom portion of the sealing assembly of FIG. 2A relative to the center axis.

Referring to FIGS. 3 and 6, each one of the collecting channel 70 and the draining pocket 78 has a depth 82, 84 relative to the inner periphery 54 in the radial direction R relative to the center axis 48. The depth 84 of the draining pocket 78 is greater than the depth 82 of the collecting channel 70.

Figure 5:
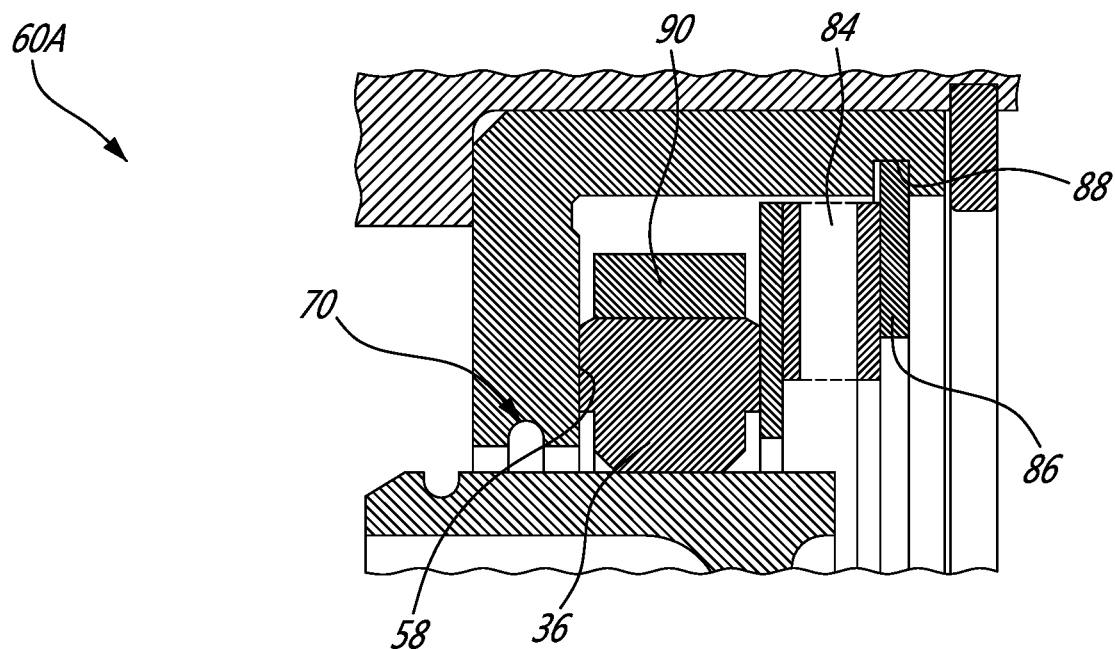
FIG. 5 is an enlarged view of a top portion of the sealing assembly of FIG. 2A relative to a center axis thereof.

Referring to FIGS. 5-6, the sealing assembly 20 may include a bias member 84 to bias the seal element 36 and the contact surface 58 toward each other to form the sealing face 40. For example, the bias member 84 may be a spring as shown in FIGS. 2A and 5-6. The sealing assembly 20 may also include a retaining ring 86 received in a groove 88 defined in an inner surface of the sleeve 64 to retain the bias member 84 between the seal element 36 and the retaining ring 86. The sealing assembly 20 may also include a shrink band 90 engaged to the seal element 36 about an outer circumferential surface thereof. The shrink band 90 may maintain the seal element 36 in compression therewithin and/or define the gap 46, the clearance, and/or the rubbing tension between the seal element 36 and the seal runner 32.

Referring to FIG. 7A, the upper half or top portion 60A of the seal assembly 20 is shown. The collecting channel 70 of the seal housing 38 may be positioned relative to the seal runner 32 to minimize spreading oil from the seal housing 38 to the seal runner 32, prevent spreading oil from the seal housing 38 to the seal runner 32, or do both. These optional configurations can be used where the oil droplets OD may also drip on the seal runner 32 and flow toward the seal element 36. FIGS. 7B-7C illustrate different positions of the collecting channel 70 relative to the seal runner 32.

With reference to FIG. 7B, the collecting channel 70 is aligned with the dripping groove 68 of the seal runner 32 such that the collecting channel 70 and the dripping groove 68 are placed opposite each other. In other words, the collecting channel 70 faces the dripping groove 68. The axial width 72 of the collecting channel 70 is shown to be equal as an axial width of the dripping groove 68. In other embodiments, the axial widths may be different. In operation, as shown in FIG. 7B, the oil that may drip on the seal runner 32 from the collecting channel 70, the lip 76, or both, can be captured or received by the dripping groove 68, another part of the seal runner 32, or both.

With reference to FIG. 7C, the collecting channel 70 is offset from the dripping groove 68 such that the dripping groove 68 is axially positioned between the collecting channel 70 and the contact surface 58. In operation, as shown in FIG. 7C, the oil that may drip on the seal runner 32 from the collecting channel 70, the lip 76, or both, can be stopped by the dripping groove 68. The dripping groove 68 can serve as a barrier in a similar way as described for the collecting channel 70 above. Alternately, the oil that may drip on the seal runner 32 from the collecting channel 70, the lip 76, or both, may not reach the seal runner 32 and drip directly in the bearing cavity 22 or the like if the collecting channel 70 is positioned sufficiently away or apart from the seal runner 32.

Referring to FIGS. 8A-8B, a sealing assembly 120 according to an alternate embodiment is shown. The sealing assembly 120 is similar to the sealing assembly 20 described above, and like numerals will indicate like parts. The collecting channel 70 of the sealing assembly 120 is defined circumferentially in the inner periphery 54 about the center axis 48 between a first lip 130 and a second lip 132, the first and second lips 130, 132 project radially inward relative to, and toward, the center axis 48.

At least a tip of the second lip 132 in the bottom portion 60B of seal housing 38 is radially closer to the center axis 48 than a tip of the first lip 130. In other words, a shortest distance between the tip of the second lip 132 is closer to the center axis 48 than a shortest distance between the tip of first lip 130 and the center axis 48. As such, a step D is defined between the first and second lips 130, 132. In operation, the step D is provided to direct the flow of oil from the collecting channel 70 toward the bearing cavity 22 (to the left direction of FIG. 8B) and minimize or limit the flow of oil toward the seal element 36 (to the right direction of FIG. 8B). The second lip 132 may be closer to the center axis around the center axis 48 than the first lip 130. That is, along the whole circumference of the inner periphery 54. Stated differently, the second lip 132 forms a higher barrier than the first lip 130, in such a way that oil overflow in the collecting channel 70 will be directed over the first lip 130.

The first lip 130 may extend from the exterior surface 56 to a first boundary of the collecting channel 70 on one side thereof, and the second lip 132 may extend from the contact surface 58 to a second boundary of the collecting channel 70 on the other side thereof. That is, the collecting channel 70 is defined between the first and second boundaries. The first boundary is closer to the exterior surface 56 and the second boundary is closer to the contact surface 58.

The tips of the first and second lips 130, 132 axially extend along the center axis 48 along the center axis 48. These tips may be parallel to each other. However, the first lip 130, the second lip 132, or both lips 130, 132 may have a pointy shape such that each tip defines a thin edge of the respective first and second lips 130, 132.

As shown in the embodiment of FIGS. 8A-8B, the sealing assembly 120 does not include the draining pocket 78. However, the sealing assembly 120 may include the draining pocket 78 in addition to the step D.

The above description is meant to be exemplary only, and one skilled in the art will recognize that changes may be made to the embodiments described without departing from the scope of the invention disclosed. For example, it is understood that the shape and size of the collecting and draining pockets may vary and yet collect the oil and drain it away from the seal. Still other modifications which fall within the scope of the present invention will be apparent to those skilled in the art, in light of a review of this disclosure, and such modifications are intended to fall within the appended claims

The invention claimed is:

1. A sealing assembly for sealing between an oil a bearing cavity and an air cavity of a gas turbine engine, the sealing assembly comprising:
a seal having a seal element and a circumferential seal housing receiving the seal element, the seal housing having an annulus extending circumferentially around a center axis, radially between an outer periphery and an inner periphery, and axially along the center axis between a first surface and a second surface, the seal housing having a bottom portion configured to be positioned below the center axis relative to a direction of gravity when the seal is mounted to the gas turbine engine, a collecting channel defined circumferentially in the inner periphery about the center axis between a first lip and a second lip, the first lip and second lip projecting radially inward relative to, and toward, the center axis, at least a tip of the second lip in the bottom portion of the seal housing being radially closer to the center axis than a tip of the first lip, the second lip configured to be closer to the air cavity than the first lip, and a draining pocket defined in a portion of the seal housing configured and disposed to in use collect liquid oil during engine operation, the draining pocket extending from the collecting channel to the first surface and configured to communicate collected liquid oil from the collecting channel to the bearing cavity.

2. The sealing assembly as defined in claim 1, wherein the portion includes a lowest circumferential position of the inner periphery relative to a direction of gravity when the seal is mounted to the gas turbine engine.

3. The sealing assembly as defined in claim 2, wherein a bottom of the draining pocket is disposed in a same circumferential position relative to the center axis as the lowest circumferential position.

4. The sealing assembly as defined in claim 1, wherein a depth of the draining pocket relative to the inner periphery in a radial direction relative to the center axis is greater than a depth of the collecting channel relative to the inner periphery in the radial direction.

5. The sealing assembly as defined in claim 1, wherein the collecting channel has a U-shaped cross-section.

6. The sealing assembly as defined in claim 1, wherein the draining pocket is defined by a depression in the first surface and a contiguous depression thereof in the inner periphery.

7. The sealing assembly as defined in claim 1, wherein the seal housing includes a circumferential leg extending along the outer periphery away from the first surface to form a sleeve, the seal element receivable in the sleeve.

8. The sealing assembly as defined in claim 1, wherein the first surface extends in a plane perpendicular to the center axis.

9. The sealing assembly as defined in claim 1, wherein the seal element abuts the second surface of the seal housing.

10. A seal housing for sealing between a bearing cavity and an air cavity of a gas turbine engine, the seal housing comprising:
    a circumferential body defined as an annulus extending circumferentially around a center axis, radially between an outer periphery and an inner periphery, and axially along the center axis between a first surface and a second surface, the seal housing having a bottom portion configured to be positioned below the center axis relative to a direction of gravity when the seal housing is mounted to the gas turbine engine, a collecting channel defined circumferentially in the inner periphery about the center axis between a first lip and a second lip, the first and second lips projecting radially inward relative to, and toward, the center axis, at least a tip of the second lip in the bottom portion of the seal housing being radially closer to the center axis than a tip of the first lip, the second lip configured to be closer to the air cavity than the first lip.

11. The seal housing as defined in claim 10, wherein the tip of the first lip axially extends parallel to the tip of the second lip.

12. The seal housing as defined in claim 10, wherein the bottom portion includes a lowest circumferential position of the inner periphery relative to the direction of gravity when the seal housing is mounted to the gas turbine engine.

13. The seal housing as defined in claim 12, wherein at least the tip of the second lip is disposed in a same circumferential position relative to the center axis as the lowest circumferential position.

14. The seal housing as defined in claim 10, wherein the first lip extends from the first surface to a first boundary of the collecting channel and the second lip extends from the second surface to a second boundary of the collecting channel, the collecting channel defined between the first and second boundaries.

15. The seal housing as defined in claim 10, wherein the collecting channel has a U-shaped cross-section.

16. The seal housing as defined in claim 10, wherein the second lip is radially closer to the center axis than the first lip around the center axis.

17. The seal housing as defined in claim 10, wherein the first surface extends in a plane perpendicular to the center axis.

18. A method for sealing a bearing cavity of a gas turbine engine, the method comprising:
    directing air toward the bearing cavity through a gap between a seal housing and a seal runner;
    collecting oil in a collecting channel defined circumferentially in an inner periphery of the seal housing around a center axis;
    flowing collected oil from the collecting channel toward a draining pocket, the draining pocket defined at a lowest circumferential position of the inner periphery relative to a direction of gravity when the seal housing is mounted to the gas turbine engine; and
    draining the oil from the draining pocket away from the inner periphery.

19. The method as defined in claim 18, comprising retaining the oil in the collecting channel only through adherence of the oil to the collecting channel.

* * * * *